3,726,767
MICROBIOLOGICAL REACTION CHAMBER APPARATUS
Fred K. White, Glenellyn, Ill., assignor to Miles Laboratories, Inc., Elkhart, Ind.
Filed Aug. 27, 1971, Ser. No. 175,492
Int. Cl. C12b 1/00
U.S. Cl. 195—127      4 Claims

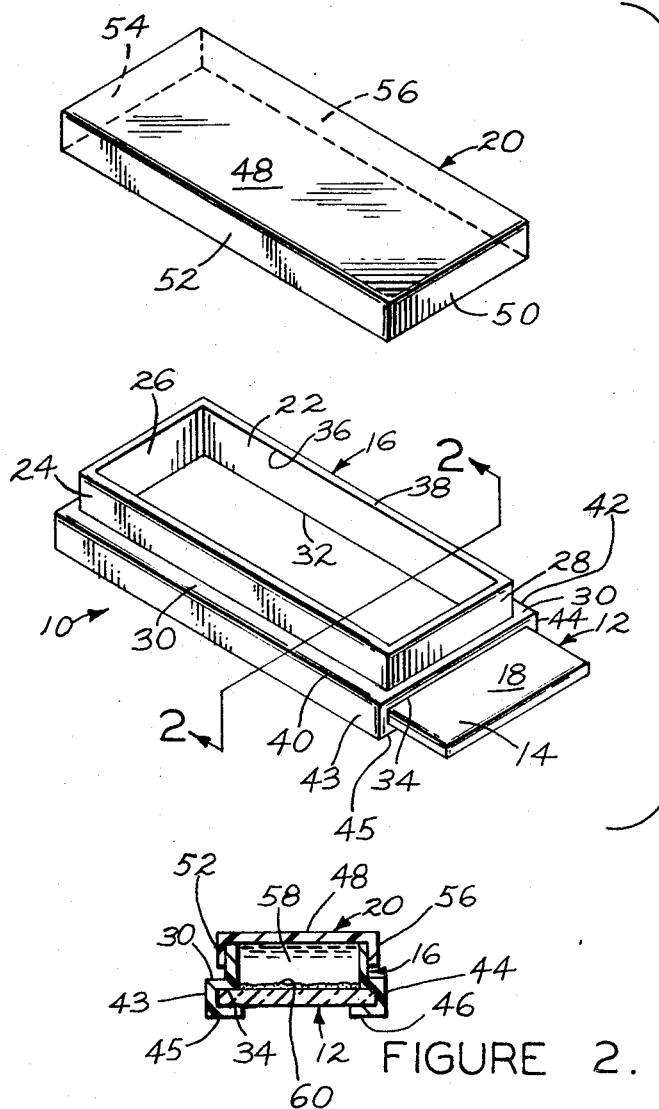
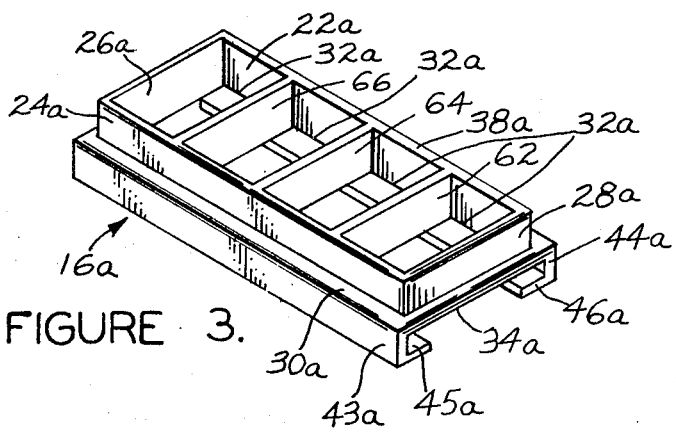

ABSTRACT OF THE DISCLOSURE

Microbiological reaction chamber apparatus having a bottom wall and sidewalls which is useful, for example, to produce a tissue culture directly on a base, such as a microscope slide, for subsequent examination and storage comprises in combination a base member which forms the bottom of said chamber and a receptacle member removably attached by clamping means in liquid-impermeable contact with said base member. One aspect of the invention resides in the novel receptacle component useful in the fabrication of the overall apparatus. In one use of this apparatus, a liquid tissue culture medium can be placed in the receptacle chamber in contact with the base, and the medium is incubated to allow the tissue culture to grow and to attach such growth to the base. The liquid medium is then removed from the chamber, and the receptacle is removed from the base. The tissue culture growth on the base can then be treated as desired and microscopically examined.

BACKGROUND AND PRIOR ART

It is frequently desirable in medical laboratory practice as well as in microbiological research to grow various bacteria, cells or tissues in particular media and then to examine the resulting growth. A particularly major use of this technique is in virology laboratories where host cells are grown and then used to detect viral activity.

In general, the prior art tissue cultures were obtained in the following manner. A known measured amount of liquid growth medium containing a suspension of the cells to be grown was placed in a sterilized glass test tube. The tube was then sealed with a non-toxic stopper and placed on its side in an appropriate rack and oriented so that the area of cell attachment and growth was always immersed in a nutritional fluid environment. The tube was then incubated until a complete cell monolayer was grown. The tube was then examined microscopically to check for growth and then again to check for any cytopathologic changes induced by an experimental treatment during such growth.

In order to obtain a permanent stained slide of any such cytopathologic changes which occurred during the above growth, a second cell culture had to be prepared. A cleaned glass coverslip was placed in a specially modified glass tube and a portion of liquid growth medium containing a suspension of the cells to be grown was placed in the tube in contact with the coverslip. The tube was then sealed and incubated as described above to grow a cell monolayer on the coverslip. The same experimental treatment was repeated to affect the same cytopathologic changes. When the desired cell growth and changes were accomplished, the coverslip was removed from the tube, rinsed, fixed and stained. The stained coverslip was then mounted on a microscope slide for subsequent examination and storage.

This prior art technique required many manipulative steps and complex apparatus in order to produce stained tissue cultures on microscope slides.

In addition to the production of tissue cultures, there are other microbiological procedures which are carried out in reaction chambers using complex and cumbersome prior art apparatus.

It is an object of the present invention to provide improved microbiological reaction chamber apparatus.

SUMMARY OF THE INVENTION

In accordance with the present invention, a receptacle useful in the fabrication of a microbiological reaction chamber apparatus comprising a base member and a cooperable receptacle removably mated thereto is provided, said receptacle comprising a member having sidewalls forming a chamber and having an opening surrounded by an end surface capable of being removably mated in liquid-impermeable contact with a base member, and clamping means capable of removably clamping said receptacle surface against a cooperable base member.

DESCRIPTION OF THE DRAWINGS

FIG. 1 is a partially-exploded perspective view of one embodiment of the present invention;

FIG. 2 is a vertical cross-sectional view taken along line 2—2 of an unexploded form of FIG. 1 and showing a liquid growth medium contained within the apparatus;

FIG. 3 is a perspective view of another embodiment of a receptacle of the present invention;

DESCRIPTION OF THE INVENTION

Figure 4:
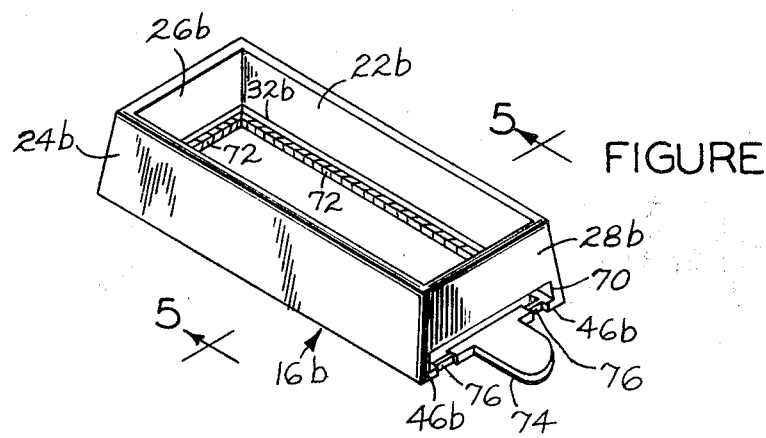
FIG. 4 is a perspective view of still another embodiment of a receptacle of the present invention.

Referring to FIG. 1, the microbiological reaction chamber apparatus 10 of the present invention comprises in part a base member 12 having a planar upper surface 14. A component member 16 forming a receptacle is clamped to the base member 12 and mates against surface 14 leaving a portion 18 of surface 14 exposed. This free surface area 18 can be etched so as to render it capable of receiving appropriate identification markings, or an appropriate label can be affixed to this free surface area. A cover 20 capable of fitting over and closing the top of receptacle 16 is shown in exploded relation above receptacle 16.

Base member 12 is preferably a glass microscope slide when the microbiological reaction chamber apparatus 10 is intended to be used for tissue culture. Such microscope slide is preferably fabricated from soda glass which has been cleaned to remove oils, greases, surfactants, abrasives or other materials inhibitory to biological growth. Upper surface 14 of base member 12 must be reasonably flat to form a mating surface for receptacle 16. Glass microscope slides useful in the present invention are marketed by the Erie Scientific Co. under the designations ESCO No. 2955–F or No. 34. It is understood that other materials, such as sintered alumina, organoplastics and the like, can also be used for the base member 12 for microbiological reaction chamber apparatus of the present invention, providing such materials are appropriately cleaned and do not inhibit the desired biological reaction.

Receptacle member 16 is formed of upstanding longitudinal sidewalls 22 and 24 and upstanding transverse endwalls 26 and 28. At its base the member 16 is formed with a peripheral outwardly directed flange 30 having a lower surface 34 which is coplanar with the lower edges of sidewalls 22 and 24 and endwalls 26 and 28 and forms an annular rectangular end surface surrounding a lower end opening 32. The upper edges of the sidewalls 22 and 24 and endwalls 26 and 28 are coplanar and form an upper end opening 36 and an annular rectangular top planar surface 38. Flange 30 has a length less than that of base member 12.

Receptacle member 16 is formed with clamping means depending from the outer longitudinal edges 40 and 42 of the flange 30 and extending along substantially the entire length thereof. The aforementioned clamping means comprise downwardly extending walls 43 and 44 and inwardly extending flanges 45 and 46. The clamping means in conjunction with flange 30 forms a pair of inwardly facing channel members of C-shaped cross-section. The space between the surface 34 and flanges 45 and 46 is equal to or slightly less than the thickness of base member 12 and the distance between the inner surfaces of walls 43 and 44 is equal to or slightly larger than the width of base member 12.

Cover 20 comprises a planar top wall 48 and depending edge walls 50, 52, 54 and 56 which are all substantially normal to the top wall. The dimensions of the cover top and depending edge walls are such that when cover 20 is placed in operative position on receptacle 16 as shown in FIG. 2, the depending edge walls have a loose telescopic fit with respect to the outer surfaces of the sidewalls and endwalls of receptacle 16, allowing the cover 20 to be easily removed and replaced when desired. Upper planar surface 38 of receptacle 16 mates against the undersurface of top wall 48 when the cover 20 is placed on said receptacle.

Receptacle 16 and cover 20 are preferably formed from organoplastic materials and they need not both be of the same material. Useful organoplastic materials are polystyrene, polypropylene, celluloid, polymethacrylate, polymethylmethacrylate, organopolysiloxane elastomers and the like.

The preferred procedure for fabricating the microbiological reaction chamber apparatus of the present invention is to place an appropriate mold on and around a suitable base member 12 and to form the recptacle 16 in place by inserting desired material into the mold. The mold is then removed resulting in a receptacle removably attached to the base member.

Alternatively, the receptacle member 16 can be molded and formed separately. The base member 12 is then slipped into the channel members formed by the flanges 30, 45 and 46 and walls 43 and 44 until one end of the base member is substantially flush with the corresponding end of the flange 30. Since the base member 12 is longer than receptacle 16, the free surface area 18 of base member 12 is thus exposed near the opposite end of receptacle 16. In both fabrication techniques the dimensional relationship between the clamping means of receptacle 16 and the base member 12 is such that the lower surface 34 of receptacle 16 is removably mated in liquid-impermeable contact with upper surface 14 of the base member. When desired at a subsequent time, the receptacle 16 can be easily removed from the base member 12 by withdrawing the base member from the clamping channels or by pulling the clamping channels away from the base member.

After fabrication of the combination microbiological reaction chamber apparatus, it is then sterilized in any well-known manner, and the end opening 36 of receptacle 16 is covered with sterile tape (not shown) or preferably with a sterile cover 20. The apparatus can then be stored until ready for use.

The novel microbiological reaction chamber apparatus of the present invention is employed in the following manner to grow tissue cultures, for example. The tape (not shown) or cover 20 is removed from the receptacle 16 to expose the chamber thereof. The desired liquid tissue culture medium 58 (FIG. 2) containing a suspension of cells to be grown is then placed into the chamber of receptacle 16. As shown in FIG. 2, the close mating of the upper surface of base member 12 and the annular lower surface 34 of receptacle 16 forms a liquid-impermeable seal preventing any leakage from the chamber. The top of the receptacle is then covered with tape (not shown) or cover 20. Appropriate identification markings are then entered on the free surface area 18 of base member 12 to describe the contents of the chamber. The apparatus is then placed in a suitable incubator and is incubated under well-known conditions to carry out the tissue culture growth. If desired, suitable treatment is carried out on the medium during this growth to achieve cytopathologic changes in the cells. As shown in FIG. 2, at the conclusion of the growth period a mass of tissue cells 60 is attached to base member 12. The cover 20 is then removed, the tissue culture medium is removed from the chamber by aspiration, for example, and the receptacle 16 is separated from the base member 12. The mass of tissue cells attached to the base member is then rinsed and fixed on the base member and the affixed tissue culture is then treated with an appropriate stain to stain the culture.

The base member 12 with the stained tissue culture fixed thereto can then be microscopically examined and stored for further use. This permanent record of the results of the tissue culture growth can be produced through use of the apparatus of the present invention in a far simpler and more efficient manner than through the use of the techniques employed in the prior art.

A further embodiment of the component receptacle member 16a is shown in FIG. 3. Elements corresponding to elements in the receptacle 16 of FIG. 1 have the same numbers with the suffix "a." The main chamber formed by longitudinal sidewalls 22a and 24a and transverse endwalls 26a and 28a is further divided into a plurality of chambers by transverse walls 62, 64, and 66 which are parallel to endwalls 26a and 28a. The upper edges of transverse walls 62, 64 and 66 are coplanar with the top surface 38a of walls 22a, 24a, 26a and 28a and form open ends for each of the chambers formed by such walls. The lower edges of transverse walls 62, 64 and 66 are coplanar with the lower surface 34a of flange 30a to form end openings 32a for each of the chambers formed by such walls, each such end opening being surrounded by an end surface. The clamping means formed by downwardly extending walls 43a and 44a and inwardly extending flanges 45a and 46a function in the same manner as described above for FIGS. 1 and 2.

The receptacle 16a of FIG. 3 can be employed to simultaneously grow tissue cultures of several different organisms or the same organism in different media.

Figure 5:
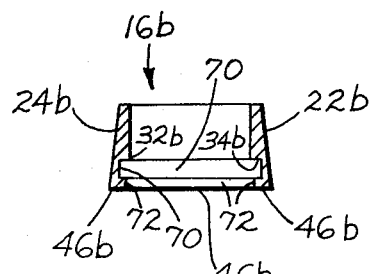
FIG. 5 is a vertical cross-sectional view taken along line 5—5 of FIG. 4.

Still another embodiment of the component receptacle member is shown in FIGS. 4 and 5. Elements corresponding to elements in the receptacle 16 of FIG. 1 have the same numbers with the suffix "b." The outer surfaces of longitudinal sidewalls 22b and 24b and transverse endwalls 26b and 28b slope outwardly when viewed in a downward vertical direction. The inner surfaces of the sidewalls 22b and 24b and of endwalls 26b and 28b are formed with a continuous rectangular groove 70 near the lower portions thereof. As shown in FIG. 4, the groove 70 extends completely through endwall 28b and a portion of the endwall 28b below groove 70 is removed. The inner portions of the sidewalls and endwalls below groove 70 are cut-back slightly to form verticle surfaces 72. These lower wall portions form a continuous inwardly extending flange 46b. The groove 70 defines an end opening 32b for the receptacle 16b. The upper substantially horizontal surface of groove 70 forms an annular rectangular end surface 34b surrounding end opening 32b.

In the use of this embodiment, a base member (not shown in FIGS. 4 and 5) of the type shown in FIG. 1 is placed in groove 70 and mates at one end against the endwall 26b. The vertical width of the groove 70 is equal to or slightly less than the thickness of the base member. Annular surface 34b thus mates against the upper surface of the base member and forms a liquid-impermeable seal around the entire periphery of end opening 32b. Flange 46b clamps against the under-portion of the base member and holds the base member in place.

The receptacle 16b can be easily separated from the base member by withdrawing the base member from the groove 70 or by removing flange 46b from the base member.

In a preferred form of the embodiment of FIG. 4, a tab 74 is attached to flange 46b through rupturable connectors 76. When the receptacle 16b is used in combination with a base member, the tab 74 and connectors 76 tend to prevent the portions of flange 46b associated with endwall 28b from being easily removed from the base member. When it is desired to remove the receptacle 16b from the base member, tab 74 is pulled away from endwall 28b rupturing the connectors 76. Flange 46b can then be easily pulled away from the base member.

The receptacles described above all have rectangular-shaped cross-sections. It is understood, however, that apparatus of the present invention can employ receptacles having other cross-sectional shapes, such as circular, for example.

What is claimed is:

1. A cooperable receptacle useful in the fabrication of a microbiological reaction chamber apparatus comprising a flat base member, a cooperable receptacle removably mated thereto and a removable cover for such cooperable receptacle, said cooperable receptacle comprising a member having sidewalls forming a chamber with a first end opening surrounded by a coplanar end surface and a second end opening opposite from said first end opening, said second end opening of said cooperable receptacle capable of being removably covered by said removable cover, said member having sidewalls also having clamping means integrally formed as a part of said member having sidewalls and projecting from said end surface, said end surface capable of being removably mated in liquid-impermeable contact against said flat base member with said clamping means removably clamping said end surface against said flat base member.

2. A cooperable receptacle according to claim 1 wherein the clamping means includes an inwardly extending flange formed as an integral part of the clamping means projecting from the end surface, said flange being capable of mating against said flat base member and clamping said flat base member against said end surface.

3. A cooperable receptacle according to claim 1 which includes wall means defining a plurality of chambers, each chamber having two opposing open ends, one open end of each chamber being surrounded by a coplanar end surface portion which is capable of mating against a base member.

4. A microbiological reaction chamber apparatus comprising the combination of a cooperable receptable of claim 1 removably clamped in liquid-impermeable contact against a flat base member with a removable cover positioned over the second end opening of said cooperable receptacle.

References Cited

UNITED STATES PATENTS

| | | | |
|---|---|---|---|
| 3,141,548 | 7/1964 | Newby | 206—1 |
| 3,158,553 | 11/1964 | Carski | 195—139 |
| 3,203,870 | 8/1965 | Andelin | 195—139 |
| 3,055,808 | 9/1962 | Henderson | 195—139 |
| 3,591,461 | 7/1971 | Bazil | 195—142 |
| 3,065,669 | 11/1962 | Orsi | 88—40 |

ALVIN E. TANENHOLTZ, Primary Examiner

R. B. PENLAND, Assistant Examiner

U.S. Cl. X.R.

195—1.7; 206—1 R; 220—41